May 27, 1969  F. C. GAINES, JR  3,446,272
AUTOMATIC TEMPERATURE CONTROL OF GREENHOUSE
Filed April 19, 1967  Sheet 1 of 3
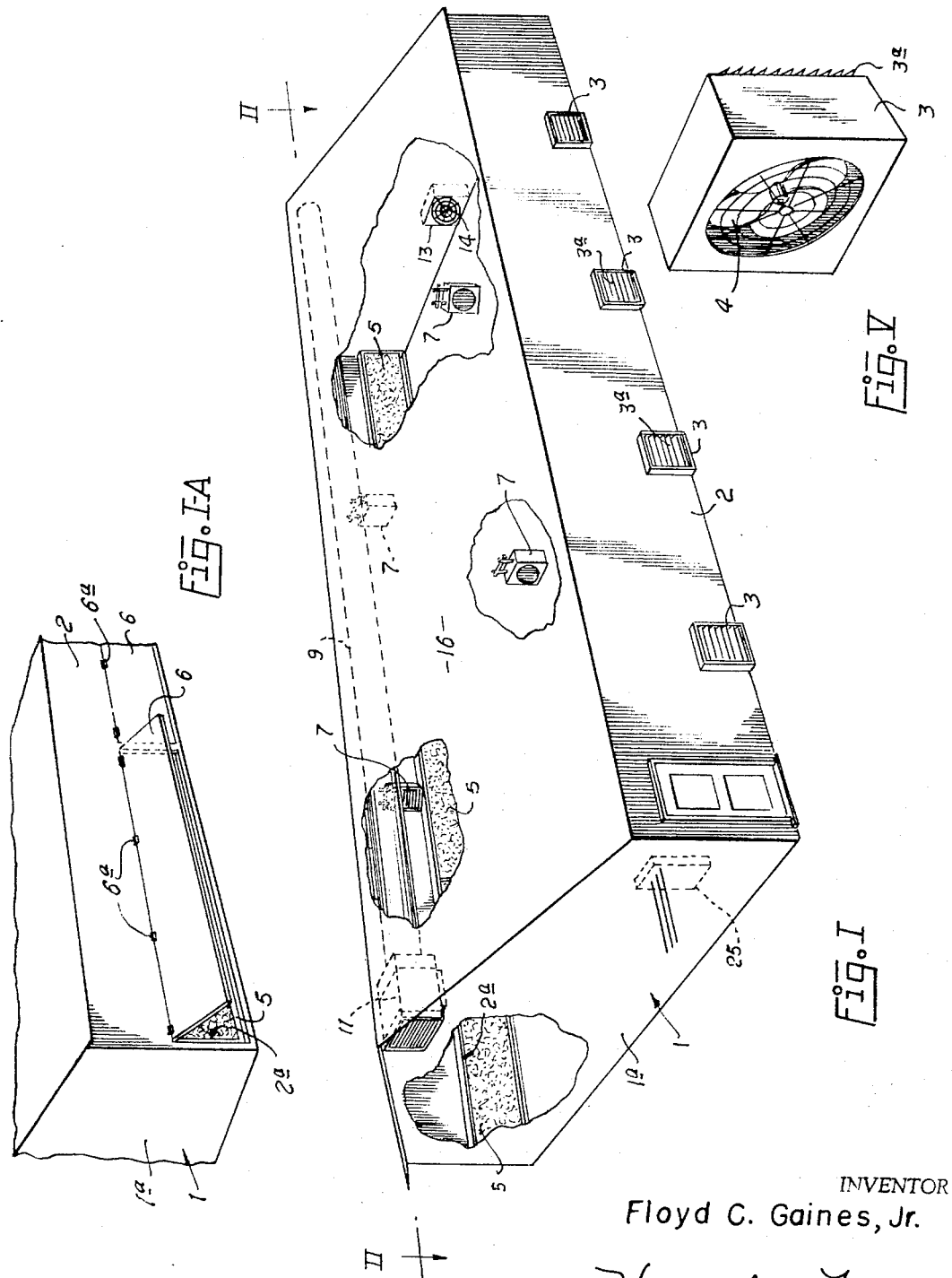
INVENTOR
Floyd C. Gaines, Jr.
BY Howard E. Moon
ATTORNEY

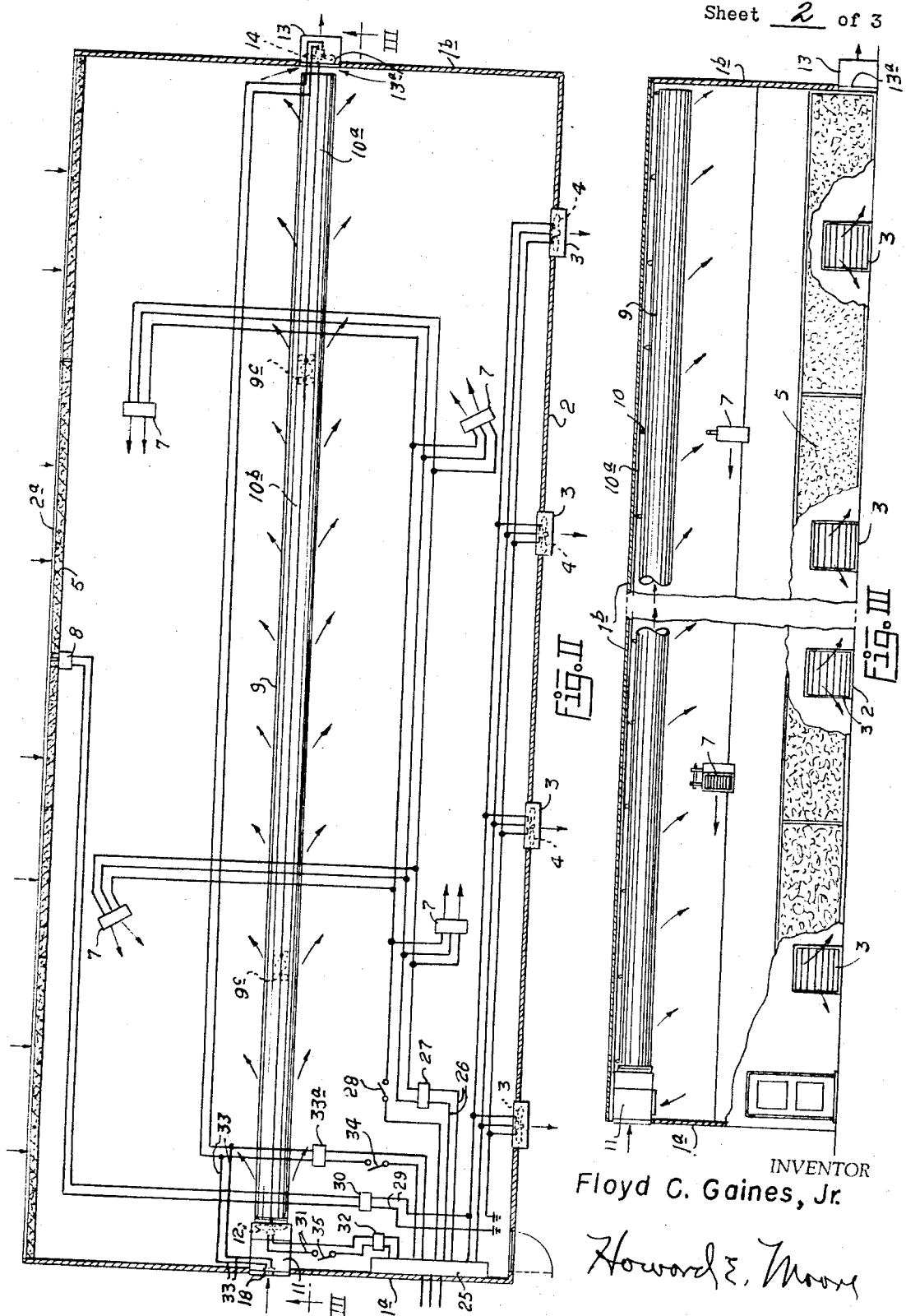

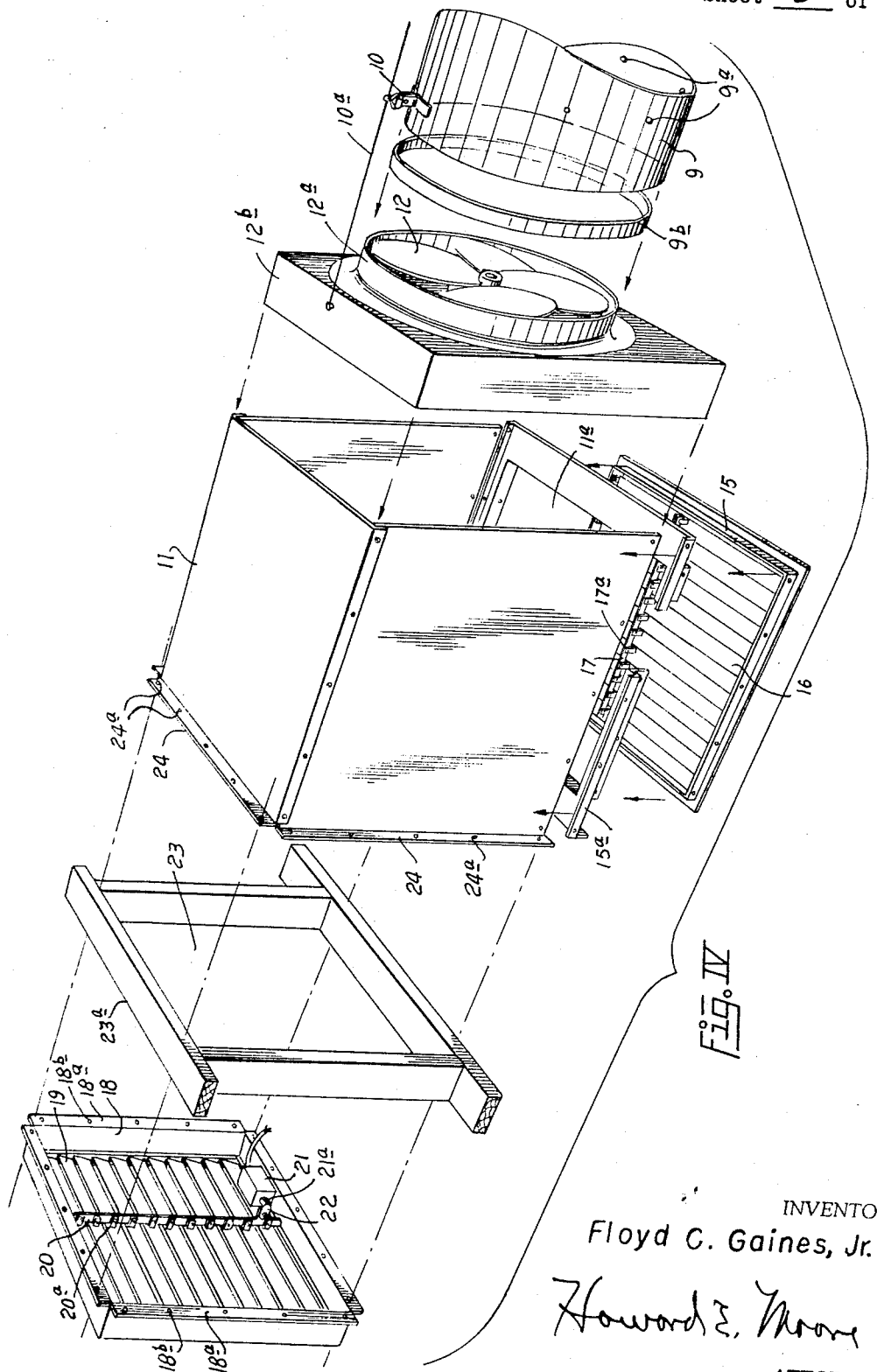

United States Patent Office 3,446,272
Patented May 27, 1969

3,446,272
AUTOMATIC TEMPERATURE CONTROL OF GREENHOUSE
Floyd C. Gaines, Jr., Dallas, Tex., assignor to Pan American Hydroponics, Inc., Grapevine, Tex.
Filed Apr. 19, 1967, Ser. No. 632,097
Int. Cl. F24f *3/14;* B01f *3/02;* G05d *21/00*
U.S. Cl. 165—21                              5 Claims

ABSTRACT OF THE DISCLOSURE

An automatic greenhouse having basic environmental control systems incorporated therein including exhaust fans and evaporative pads through which air is drawn by the exhaust fans to provide cooling and humidity control in the summer. Propeller driven unit heaters within same are thermostatically controlled to provide heating when desired. Thermostatically and/or humidistatically controlled circulating and recirculating and ventilating means for controlling the temperature and humidity within the greenhouse operate both summer and winter.

Summary of the invention

The entire system may be set and controlled from a common control panel. The entire system is automatic in its operation to control temperature and humidity within the greenhouse for proper plant culture both winter and summer.

In normal daytime summer operation the exhaust fans mounted in one wall of the greenhouse are functioning to draw air crosswise of the greenhouse through evaporative pads installed in the opposite wall thereof. A recirculating pump is provided for constantly circulating water to keep the evaporative pads saturated. In typical operation the thermostat controlling the operation of the recirculating pump and the circulating fans is set to maintain the temperature in the greenhouse at approximately 80° Fahrenheit.

Should the temperature in the greenhouse drop below a certain value say 60° F., the thermostat controlling the operation of the pump and exhaust fans will be energized to stop the pump and exhaust fans, and the thermostat controlling the heaters is energized to start the heaters, bringing the temperature back to the desired level at which time the exhaust fans may again be actuated to cool the interior of the greenhouse while the exhaust fans, pump and burners may be contemporaneously in operation to supply regulated heat and humidity to the interior of the greenhouse, as desired.

A recirculating fan is provided in conjunction with a distribution system consisting of a perforated plastic convection tube running the length of the greenhouse through which air is recirculated and dispersed lengthwise thereof in order to provide for uniform temperature and humidity throughout the area of the interior of the greenhouse.

In normal operation when the temperature and humidity within the greenhouse are within acceptable limits the recirculating fan will be operating to uniformly distribute the air throughout the greenhouse. However in the event the humidity and/or temperature should rise above predetermined adjusted limits a motor driven shutter communicating with the exterior of the greenhouse may be actuated simultaneously with an exhaust fan at the end of the greenhouse to draw air in from the outside of the greenhouse to distribute the same through the plastic convection tube and exhaust same at the other end of the greenhouse to thereby control the temperature and humidity within the greenhouse until it has been brought within acceptable limits. At the time that the motorized shutter is opened and the exhaust fan at the other end of the greenhouse is energized the recirculating shutter is closed. Thus fresh air is brought in from the outside and circulated throughout the greenhouse as used air is exhausted therefrom to thereby control and regulate the temperature and humidity within the greenhouse.

Thereby there is provided automatic control both day and night of the temperature and humidity within the greenhouse both by artificial means and by drawing from the outside in response to demand, and the conditioned air within the greenhouse is evenly distributed throughout the area thereof at all times to provide the most favorable growing conditions for plants within the greenhouse.

The greenhouse herein described and claimed is particularly useful in growing plants by hydroponics wherein the plants are grown in trays to which nutrient liquid, having the necessary food ingredients for the plants dissolves therein, is continuously circulated through the trays and the transparent walls and roof of the greenhouse structure provides the necessary sunlight for growth and development of the plants.

The combination of structure and controls disclosed herein provides for a supply of humidity and air at regulated required temperatures to the plants to promote proper nurture and growth for the plants.

Other and further objects of the invention will become apparent upon reading the detailed specification hereinafter following and by referring to the drawings annexed hereto.

Description of the drawings

A suitable embodiment of the invention is shown in the attached drawings wherein, FIGURE I is a top perspective view of the greenhouse structure incorporating the improvements disclosed and claimed herein, FIGURE I–N is a fragmentary perspective view of the outside of the wall of the greenhouse wherein the evaporative pads are mounted, FIGURE II is a cross sectional elevational view of the greenhouse taken on the line II—II of FIGURE I showing a plan view of the inner side thereof with the electrical circuits for controlling the various electrical components thereof illustrated schematically, FIGURE III is a cross sectional elevational view taken on the line III—III of FIGURE II which is partially cut away to show the exhaust fans mounted in the wall of the greenhouse structure opposite the wall wherein the evaporative pads are mounted, FIGURE IV is a perspective exploded view of the circulating fan and housing therefor, the circulating louvers mounted to the lower side of the housing and the motorized shutter through which air is brought in from the outside of the greenhouse, FIGURE V is a perspective view of a typical exhaust fan which is mounted in the wall of the greenhouse structure.

Numeral references are employed to indicate the various parts shown in the drawings and like numerals indicate like parts throughout the various figures of the drawings.

Description of a preferred embodiment

Referring first to FIGURE I, the numeral 1 generally indicates the greenhouse building having end walls 1*a* and 1*b* and side walls 2 and 2' and a roof 1*c*. In one of the walls 2 there are mounted exhaust fan housings 3 which communicate with openings provided through the wall 2. The housings 3 each have pivoted louvers 3*a* therein which are counterbalanced in conventional manner so that when the fan 4 mounted in the housing is started the air pressure generated thereby will open the louvers and allow the exhaust of air from the interior of housing 1. Each fan housing 3 has a vaned fan 4 rotatedly mounted therein which is driven by an electric motor in conventional manner.

Evaporator pads 5 of conventional construction are mounted in openings 2a provided through the lower edge of the wall of housing 1 opposite the wall in which the exhaust fan housings 3 are mounted.

The openings 2a in which the evaporator pads 5 are mounted are arranged to be closed by covers 6 which are connected to the wall 2 by hinges 6a.

A plurality of circulating heaters 7 are suspended within the greenhouse and are so disposed that air ejected therefrom by conventional fans therein is circulated in a generally circular pattern about the inner side of the greenhouse as illustrated in FIGURE II. The heaters may be either electric or gas fired.

Water may be circulated to the evaporator pads 5 by a circulating pump 8 which supplies water under pressure to perforated dispersal pipes disposed above or within the evaporator pads 5. The water may be accumulated in pans (not shown) along the lower edge of the evaporator pads and recirculated to the dispersal pipes by the pump 8 in the usual manner and the level of the water in the pans may be float controlled.

An air dispersal tube 9 which may be made of flexible polyethylene plastic material or other suitable flexible material is suspended to the ceiling within the greenhouse by suitable brackets 10 which may be mounted on a wire 10a extending from end to end of the greenhouse. As shown the wire 10a is attached to the circulating fan holder 12b at one end and to the end wall of the greenhouse at the other end.

The circulation tube 9 is made of collapsible material which expands upon air being forced therethrough by the circulating fans hereinafter described. It has perforations 9a in the wall thereof spaced throughout the length thereof so that when air is circulated therethrough in the manner hereinafter described same will be emitted through the perforations 9a along the length thereof as indicated by arrows in FIGURE II. The flow of air through the tubes 9 is restricted to some extent to cause deflection of the air through the perforations 9a by baffles 9c mounted within the tube 9.

A circulating fan housing 11 is mounted in the upper portion of one of the end walls 1a so as to communicate with the outside of the greenhouse through a circulating fan 12. The fan 12 is rotated within a guard 12a secured to the inner face of a fan support flange 12b, which is arranged to be secured to the inner end of the fan housing 11. The fan housing 11 is secured to an opening 23 provided through the end wall 1a of the housing by a frame member 23a. The flanges 24 on the fan housing 11 are secured to the frame 23a by means of suitable screws which pass through holes 24a provided in the flange 24.

An automatic louver frame 15 is secured about an opening 11a in the lower side of the fan housing 11 by means of an adapter flange 15a so as to provide a louvered opening through the lower wall of the fan housing.

Overlapping louvers 16 are pivotally mounted within the louver frame 15, and the louvers are in turn pivotally mounted by lugs 17a to an operating link 17 so that when the louvers 16 are tilted on their pivots by air being forced therethrough they all move in unison as a result of the link 17 extending therebetween.

The louvers 16 are arranged to be opened when air is drawn therethrough by the circulating fan 12 by reason of the counterbalanced connection of the louvers to the frame 15 therefor.

A louver frame 18, having flange 18a thereon, is secured to the frame 23a opposite the fan housing 11 by means of screws (not shown) passing through holes 18b in the flange.

The louvers 19 are each pivotally mounted at their ends within the opening through the louver housing 18, and the louvers are each pivotally connected to an actuator link 20 by the lugs 20a so that all of the louvers are arranged to tilt in unison.

The opening through the louver frame 18 is arranged to communicate with the outer side of the greenhouse through the end wall 1a and communicates with the fan housing 11, fan 12 and circulating tube 9 to thereby permit air to be drawn into the greenhouse and circulated through the tube 9 when the louvers 19 are opened.

The louvers 19 are arranged to be pivotally opened when the electric motor 21 is energized. The shaft 21a is rotatable by the motor 21 and a crank arm 22 on the outer end thereof which is pivotally connected to the actuator link 22 so that when the motor 21 is energized the actuator link 20 is moved downwardly to pivot the louvers 19 to open position to allow air from outside of the greenhouse to be drawn therethrough. The louvers 16 are so counterbalanced that air drawn through the open louvers 16 will maintain them in open position. Therefore they close, so that substantially all air circulated through the circulating tube 9 is admitted through the open louvers 19 from outside the greenhouse.

An exhaust fan housing 13 is mounted about an opening 13a in the end wall 1b of the greenhouse, and has an exhaust fan 14 rotatably mounted therein arranged to be energized simultaneously with the energization of the motor 21, as will be hereinafter described. The exhaust fan housing 13 has pivoted louvers on the outer side thereof similar in function to the louvers 3a so that when the exhaust fan 14 is rotated air forced against the louvers will open same. The fan 14 is rotated below the outlet end of the circulating tube 9 so as to assist the circulating fan 12 when the louvers 9 are opened to draw air from the outside of the greenhouse.

A central control box 25 may be mounted on the inner wall of the greenhouse through which the circuits hereinafter described are interconnected. Switches, time clocks and other controls, may be located for energizing the circuits at selected times, temperatures or humidity levels.

For instance, if it be desired that the recirculating circuit be actuated at a certain time, for instance at sundown, and deactivated at a certain time, for instance at sunup, a time clock may bet to turn such circuit on and off at the selected times. Any other circuit may be controlled by a time clock mounted in the control box as may be desired.

The electric leads 26 supply electric current to the heater 7 for operation of the fan or heater elements therein, if they be electrically heated. Energization of the heaters 7 are controlled by a thermostat 27 positioned in the circuit so that the heaters may be turned on and off at predetermined temperature settings on the thermostat. The thermostat would be suspended from the ceiling and located centrally of the greenhouse. If desired a manually operated switch 28 may be provided in the heater circuit, in the event the thermostat might be out of order or for other reason it might be desired to manually actuate the heater 7.

A common electric circuit 29 is provided for actuation of both the pump 8 and the exhaust fans 4, and such circuit is preferably controlled by the humidistat 30 positioned in the circuit so that upon the humidity falling to a predetermined level within the greenhouse the pump 8 will be started to circulate water to the evaporator pads 5 and simultaneously therewith the exhaust fans 4 are energized to draw air from the outside through the evaporator pads to supply humidity and cooling to the interior of the greenhouse. After the humidity has risen to a certain level the humidistat 30 is actuated to turn off the pump 8 and exhaust fans 4. The pump and exhaust fan circuit could also have a thermostat therein to start and stop same at predetermined temperature settings.

The circulating fan 12 is operated through an electric circuit 31. The circulating fan 12 may be turned on by a manual switch 35 or the manual switch 35 may be supplemented by a time switch to permit the circulating fan to be turned on and off at selected times. The thermostat or humidistat 32, one or both, may be placed in the circuit 31 to permit the circulating fan 12 to be started and stopped at predetermined temperature or humidity levels.

Preferably the exhaust fan 14 and the motorized shutter 18 are controlled by a common electric circuit 33 and a thermostat or humidistat 33a may be placed in the line to actuate the motorized shutter 18 and the exhaust fan 14 simultaneously to circulate fresh outside air through the greenhouse when the temperature and/or humidity falls to a given value in which the thermostat and/or humidistat are set.

A manual switch 34 may be provided in the circuit 31 to permit energization of the automatic shutter 18 and exhaust fan 14 in the event of inoperability of the thermostat and/or humidistat 33a or for other reasons.

The operation and function of the automatic greenhouse is hereinafter described:

In normal daytime operation in summertime, when the temperature is relatively high the pump 8 and exhaust fans 4 are in operation drawing outside air through the evaporator pads 5, cooling same and adding humidity thereto to thereby maintain the temperature and humidity within the greenhouse at a desired level. The thermostat and/or humidistat 30 (one or both as desired) in the circuit controlling these components will switch them on and off at desired minimum and maximum temperatures and/or humidity within the greenhouse. If desired a time control clock may be employed in the circuit 29 for the pump 8 and exhaust fans 4 to turn this circuit on and off at desired times. In nighttime summer operation the pump 8 and exhaust fans 4 may be continued to be operated but if the outside temperature should fall below a certain level as determined by a thermostat probe (not shown) extending outside the greenhouse the pump 8 and circulating fans 4 may be turned off automatically, or they can be turned off by a manual switch.

At nighttime the recirculating fan 12 would normally be run, especially if the pump 8 and exhaust fans 4 are not in operation. As hereinbefore explained the recirculating fan 12 may be energized by a time switch at a predetermined time or it may be energized by a manual switch 35, and at a predetermined temperature or humidity setting. The motorized shutter 18 will be opened simultaneously with the energization of the exhaust fan 14 to bring in fresh air from the outside.

An any time that the temperature within the greenhouse falls below a certain predetermined level the thermostat 27 will energize the heaters 7 and will cut same off at a predetermined maximum temperature. The heaters 7 may be either gas or electric, and if gas, the gas flow thereto would be controlled by a suitable thermostat which would operate in conjunction with the thermostat 27 controlling the electric current supplied to the fans therein.

In winter operation the summer cooling and humidity supply system consisting of the pump 8, evaporator pads 5, and exhaust fans 4 would not normally be employed but they could be used if desired, it being understood that any and all of the components described herein may be selectively used either by manual, time control, thermostat or humidistat control, or they may be all used in conjunction in accordance with selected settings.

In other words the system is versatile in its operation and positively controls temperature and humidity and even distribution of conditioned air within a greenhouse. The controls may be preset to provide for automatic operation day and night without attention.

The automatic recirculating system is a matter of importance.

When the recirculating fan 12 is energized the force of air drawn through the louvers 16 open the louvers and draws air therethrough and forces same through the flexible tube 9 to expand the tube. A portion of the air is forced out through the perforations 9a in the walls thereof and the remainder is forced out through the outer end of the flexible tube. The air is thus continuously recirculated through the greenhouse, providing for even distribution thereof. Should the temperature or humidity fall below a given value the thermostat and/or humidistat 30 will energize the motor 21 of the automatic shutter assembly 18 and open the shutters 19. Simultaneously therewith the exhaust fan 14 is energized whereby air is drawn from the outside by the circulating fan 12. Since the force of the fan 12 is partially diverted to drawing air from the outside through the louvers 19, louvers 16 of the automatic shutters assembly 15 are closed so that outside fresh air alone is forced through the flexible conduit 9 and distributed through the greenhouse through the perforations 9a, and stale air is exhausted from the greenhouse by the exhaust fan 14. Thereby the temperature and humidity within the greenhouse is quickly lowered and adjusted to a desired level at which time the thermostat and/or humidistat 30 will denergize the motor 21 and close the shutters 19 and at the same time will stop the exhaust fan 14 to thereby cause the air to again be drawn through the opened shutter 16 and recirculated through the greenhouse. Such cycling can thus go on continuously to maintain the temperature and humidity within the greenhouse at the desired level and distribute the conditioned aid uniformly throughout the greenhouse to provide optimum growing conditions for plants therein.

Of course the greenhouse walls and the roof would be made of transparent material such as transparent plastic or Fiberglas material so as to permit the sunrays to pass therethrough to provide the proper light and sunrays for growth of the plants therein.

It will be seen that I provided automatic environmental control for the interior of a greenhouse which provides for a control of temperature, humidity and air distribution within the greenhouse at all times day or night.

It will be understood that other and further forms of my invention may be devised without departing from the spirit and scope of the appended claims.

Having described my invention I claim:

1. In a greenhouse; evaporator pads in one wall, means to circulate water to the evaporator pads; exhaust fans in the opposite wall of the greenhouse arranged to be simultaneously operated with the water supply means; heater means in the greenhouse to control temperature thereof; air recirculating means in the greenhouse including a circulation fan, a conduit extending longitudinally of the greenhouse in the upper portion thereof through which air may be forced by the circulating fan; perforations in the wall of the conduit; a shutter to admit air to the circulation fan including louvers automatically actuated by force of air drawn therethrough by the fan; a motor operated shutter communicating through the end wall of the greenhouse with the outside atmosphere and communicating with the circulating fan, said motor operated shutter being automatically actuated upon a predetermined temperature or humidity value within the greenhouse, the first named shutter being arranged to close upon the opening of the last named shutter; and an exhaust fan in the end of the greenhouse opposite the end where the circulating fan is located which is energized simultaneously with the motor operated shutter to draw air from the exterior to the interior of the greenhouse.

2. The combination called for in claim 1 wherein the motor operated shutter and last named exhaust fan are actuated by a common control energized by a predetermined minimum temperature.

3. As a subcombination in a greenhouse having spaced end walls and side walls; a circulating fan, a conduit connected to and arranged to receive air forced thereinto from the circulating fan; the said conduit extending longitudinally of the upper portion of the greenhouse and terminating at the opposite end from the circulating fan; perforations in the wall of the flexible conduit arranged to disperse air therefrom; a first shutter communicating with the fan and arranged to be opened by air drawn therethrough by the circulating fan; a motor operated shutter disposed in the end wall of the greenhouse adjacent the circulating fan and communicating therewith; an exhaust fan in the opposite end wall of the greenhouse; a common electric circuit arranged to open the motor operated shutter and energize the exhaust fan simultaneously; a temperature responsive member in the circuit arranged to close the circuit at a predetermined minimum temperature within the greenhouse and to open the circuit at a predetermined maximum temperature; the first named shutter being arranged to close when the second named shutter is open to allow air to be circulated through the conduit from outside the greenhouse until the temperature rises above a predetermined value at which time the second named shutter and the exhaust fan will become inoperative.

4. The subcombination called for in claim 3 wherein the conduit is flexible.

5. The subcombination called for in claim 3 wherein there are baffles in the conduit to deflect air through the perforations.

References Cited
UNITED STATES PATENTS

| | | | |
|---|---|---|---|
| 3,246,643 | 4/1966 | Stark et al. | 98—33 XR |
| 3,307,469 | 3/1967 | Bohanon | 98—33 |

FRED C. MATTERN, JR., *Primary Examiner.*

MANUEL ANTONAKAS, *Assistant Examiner.*

U.S. Cl. X.R.

47—17; 98—33; 236—44